United States Patent [19]

Schlig et al.

[11] Patent Number: 5,041,912

[45] Date of Patent: Aug. 20, 1991

[54] AVERAGING ARRAY FOR CCD IMAGERS

[75] Inventors: Eugene S. Schlig, Somers; Ying L. Yao, Millwood, both of N.Y.

[73] Assignee: International Business Machines Corporation, Armonk, N.Y.

[21] Appl. No.: 466,886

[22] Filed: Jan. 18, 1990

[51] Int. Cl.[5] .......................... H04N 3/14; H04N 5/335
[52] U.S. Cl. .......................... 358/213.13; 358/213.19; 358/213.27; 358/213.28; 382/27; 382/52
[58] Field of Search ...................... 358/213.13, 213.29, 358/213.24, 213.15, 213.27, 213.28, 213.19; 382/27, 52, 54, 22

[56] References Cited

U.S. PATENT DOCUMENTS

| 4,001,501 | 1/1977 | Weimer | 358/213.15 |
|---|---|---|---|
| 4,264,930 | 4/1981 | White | |
| 4,454,541 | 6/1984 | Dunchl | 358/213.15 |
| 4,527,199 | 7/1985 | Kinoshita et al. | 358/213.31 |
| 4,568,977 | 2/1986 | Chamberlain et al. | 358/167 |
| 4,791,677 | 12/1988 | Mori et al. | 382/27 |
| 4,797,806 | 1/1989 | Krich | 382/27 |
| 4,901,154 | 2/1990 | Suga et al. | 358/213.13 |
| 4,943,934 | 7/1990 | Hosoda et al. | 382/27 |

OTHER PUBLICATIONS

"A Multiput Output CCD Imager for Image Processing Applications", Int. Electron Devices Meeting Tech. Digest, Washington D.C., Dec. 4–6, 1978, pp. 415–418.
"Digital Picture Processing", Aziel, Rosenfield et al., Sec. 6.4, pp. 179–193.

Primary Examiner—John K. Peng
Assistant Examiner—Glenton B. Burgess
Attorney, Agent, or Firm—Ratner & Prestia

[57] ABSTRACT

In the present invention, a method is set forth for the generation of an average signal for the pels of a neighborhood, i.e., a matrix array, without corrupting individual pel values. The system which performs the method includes a metering circuit, an output register, and a filtering array. The metering circuit transfers a fixed proportion of charge signals representing a pel row in parallel from the CCD array to the filtering array. The remaining charge signals remain in an output register, which outputs them as representations of the individual pels of the image. One type of filtering operates by averaging over non-overlapping regions within the image. Charge signals which have been transferred by the metering circuit are added together along the vertical axis and are transferred to a vertical average register, whereupon, this value is serially shifted out of the vertical average register and into a horizontal summer. The horizontal summer adds the output charge along the horizontal axis. This results in an average of the individual pel values within a region of the image which is outputted form the device. Another type of filtering operates by averaging overlapping windows within the image. The charge signals from the metering circuit are split into multiple portions, each of which contributes to a different vertical sum for an averaging window. The vertical sum charge signals are split into multiple portions, each of which contributes to the area sum for an averaging window, which is created by horizontal summing performed in parallel. The resulting area averages are outputted.

27 Claims, 10 Drawing Sheets

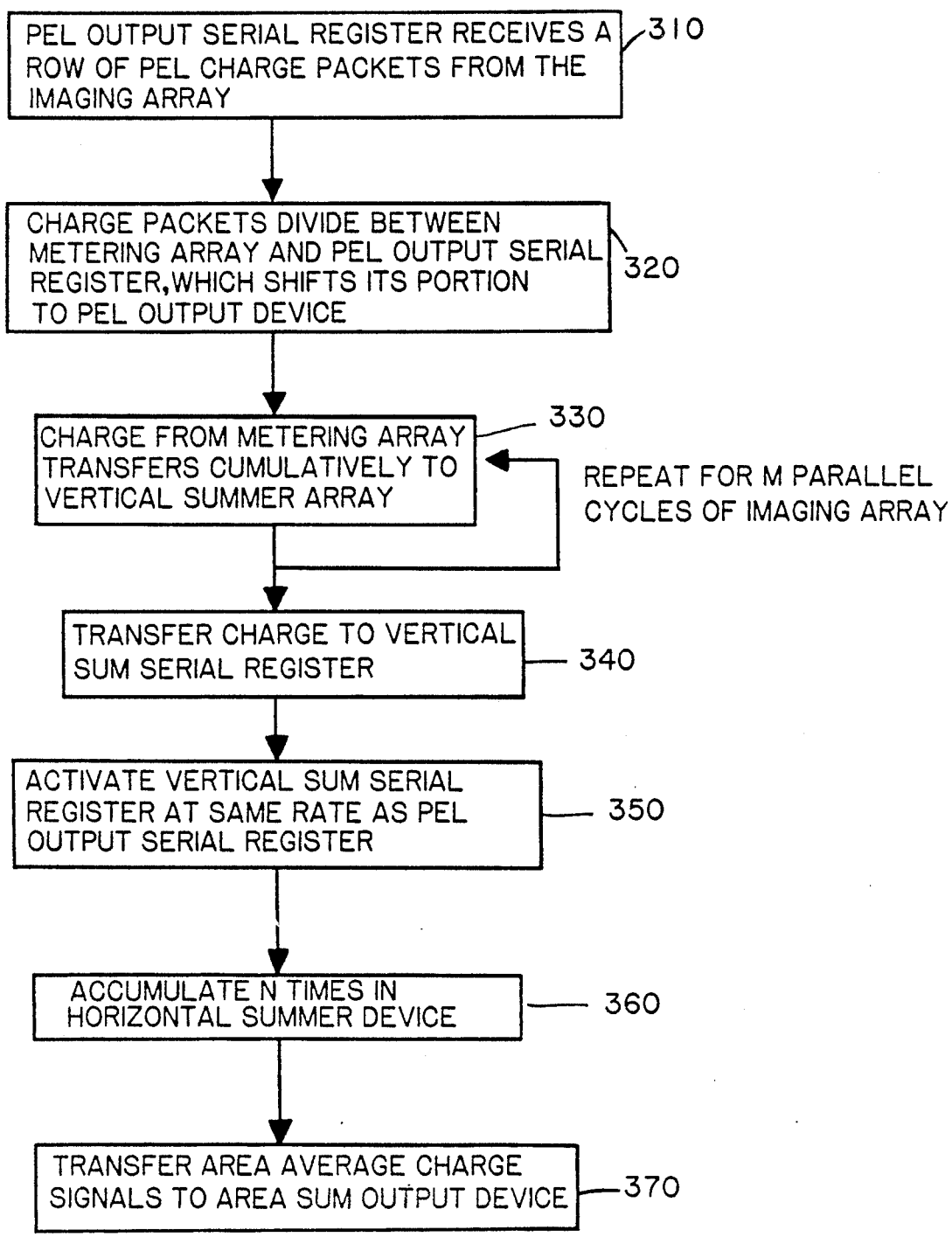

FIG. 7
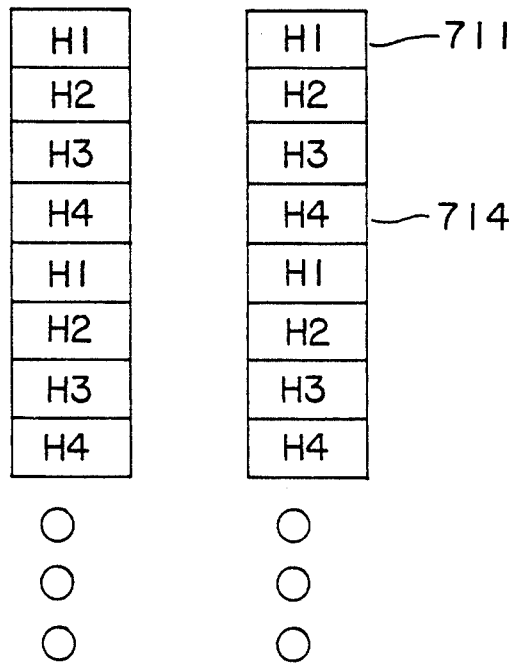
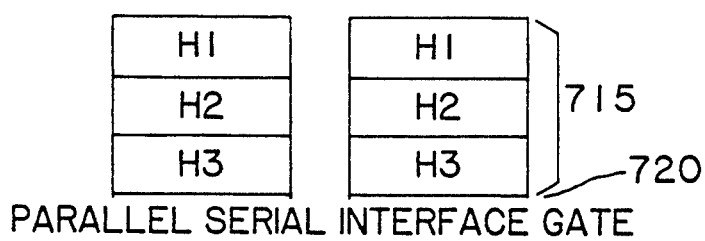
PARALLEL SERIAL INTERFACE GATE
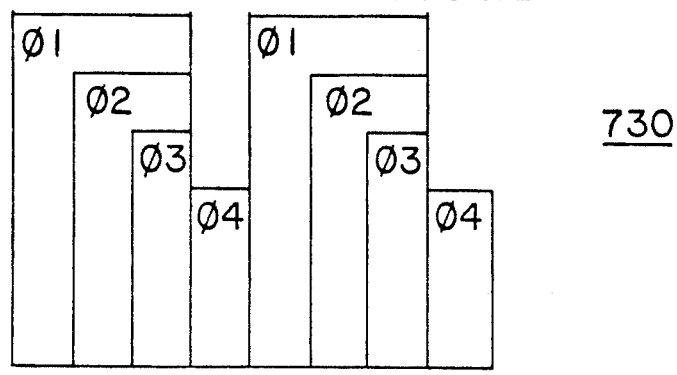

AVERAGING ARRAY FOR CCD IMAGERS

FIELD OF THE INVENTION

This invention is in the field of charge-coupled (CCD) imaging devices and specifically is directed to CCD devices including linear, time-delay and integration (TDI) and area CCD imaging arrays which generate charge packets signals corresponding to the two-dimensional array of picture elements (pels) of an optical image. In particular, a method is disclosed for the generation of the average signal of picture elements in the neighborhood of a matrix array without corrupting individual pel values.

BACKGROUND OF THE INVENTION

A two dimensional optical image typically is captured electronically as a rectangular array of samples called picture elements abbreviated as pixels or pels. One may envision the pels arranged by horizontal rows and vertical columns. Charge coupled device (CCD) arrays are used to provide electrical representations of such optical images by generating charge packets corresponding to the light intensity of pels of the image. In general, the charge packets representing a row of pels are simultaneously transferred in parallel to a serial CCD register which shifts them serially to an output device. The output device then converts these charge packets in sequence to an electrical output signal.

The image representation produced by a CCD array may be enhanced by computing the second derivative, or Laplacian, for the picture elements of the image. The Laplacian may be used for such tasks as dynamic thresholding, edge detection and edge enhancement. In a book entitled *Digital Picture Processing,* by Aziel Rosenfeld and Avinash C. Kak, at Section 6.4, pages 179–191, it is indicated that the second derivative, or Laplacian, for each picture element of a light image may be approximated by computing the difference between the light intensity measured at each picture element and the average light intensity measured in an area surrounding the picture element.

An equivalent number of area averages and picture elements are desirable, so that areas being averaged may overlap, and each pel may contribute to several images. Alternatively the imaging capability of a CCD array may be enhanced by generating area averages about certain spaced-apart individual pels of an image, wherein areas being averaged are contiguous rather than overlapping and each pel contributes to only one average. Such average signal data plays an important role in performing various image processing functions. These functions may include dynamic thresholding, filtering, edge enhancement, and digital half-tone.

One way to achieve area averaging is to digitally store a sufficient number of scan lines of the output signal of the imager, so that these stored values can be read out and processed by a digital processing unit. However, such a method is costly and is limited in speed by the performance of the digital hardware and software. Moreover, the arithmetic operation to find the mean of a set of numbers on a processor requires many Central Processing Unit cycles and memory cycles and, so, may be quite time consuming. The situation is more severe for high speed and high resolution scanner applications, since once the scanning operation of such a device is initiated, it usually cannot be interrupted due to electrical or mechanical reasons. Therefore, it may be necessary to store data representing the entire scanned image for processing purposes.

In prior art image scanners incorporating Laplacian computation, the Laplacian for each picture element of an image is derived by irradiating an ordinary CCD array with a focused image and an unfocused image. The focused image results in the formation of charge packets which are proportional to the focused light intensity at the picture elements of the image. The unfocused image forms charge packets which are proportional to the average light intensity around each picture element. The Laplacian is then derived for each picture element by subtracting the unfocused charge packets from the corresponding focused charge packets.

The equipment which has been used to accomplish this task may be fairly expensive and complicated. In order to generate the data, the apparatus may either split an image into focused and unfocused components to irradiate separate CCD arrays or may optomechanically switch a focused and unfocused image to irradiate a single CCD array.

A more efficient means of computing the Laplacian is disclosed in a paper, "A Multiple Output CCD Imager for Imaging Processing Applications", by J. E. Hall, J. F. Brietzmann, M. M. Blouke, J. T. Carlo, Int. Electron Devices Meeting Tech. Digest, Washington, D.C., Dec. 4–6, 1978, pp. 415–418. The disclosed imaging device includes an imaging array and a peripherally placed serial register that is employed to serially gate line charge packets from the imaging array. Charge packets at particular points of successively imaged lines are tapped off at fixed points on the serial register to be summed, thus computing area averages for the picture elements of the image.

Only the means of delaying, storing and tapping off are provided, leaving the summing to be performed in other devices. The apparatus has the further disadvantage that transfer inefficiencies in the serial gating process tend to degrade the electrical representation of the image in proportion to the number of transfers that are executed. Accordingly, the accuracy of the serial transfer apparatus decreases as the number of picture elements in the line of an image increases. Thus, the accuracy of the apparatus is significantly reduced for images having a relatively large number of picture elements, for example, on the order of 2000 pels per line. Also, the length of the serial register and the number of output taps increase in proportion to the number of pels that are required to compute an area average. Due to transfer inefficiencies, the increased register length results in decreased accuracy.

Another means of computing the Laplacian is disclosed in J. M. White U.S. Pat. No. 4,264,930. Within a TDI imaging array, charge packets are generated representing the vertical sum of the pels within the area surrounding each pel. Each row of vertical sum charge packets is then shifted by a serial CCD register through a horizontal summing device which sums the vertical sum packets to produce area sum packets. The White apparatus has two drawbacks. First, the vertical sum is in an array of bucket-brigade charge replicators. As compared to charge coupled devices, bucket-brigade devices are known to be less accurate and more prone to interference from excess electrical noise. Second, the horizontal sum is performed serially. Thus, the rate at which the apparatus can capture and process an image is limited by the need to process thousands of horizontal sums in sequence.

SUMMARY OF THE INVENTION

In the present invention, a method is set forth for the generation of an average signal for the pels of a neighborhood of an image, i.e., a matrix array, without corrupting individual pel values.

The invention is embodied in a system which includes a metering circuit, a pel output register, and a filtering array. The metering circuit transfers, to the filtering array, a fixed proportion of each charge signal of a row of charge signals emerging from a CCD imaging array. The remaining charge signals are transferred to the pel output serial register.

Various types of filtering arrays may be used, depending on the intended application of the disclosed invention. One type of filtering operates by averaging pel values over contiguous, non-overlapping windows within the image pel array. Assuming that the window size for averaging is an M X N pel array, each stage of a vertical summer array adds together each group of M individual charge signals which have been transferred by the metering circuit from the imaging array during M clock cycles. At each Mth clock cycle, this accumulation is then transferred in parallel to a vertical sum serial register, whereupon, the values are serially shifted out of the vertical sum serial register and into a horizontal summer. The horizontal summer adds together groups of N vertically accumulated charge packets. This results in an array of averages of individual pel values over M X N arrays from the original array of pel values. These averages are then appropriately transferred to an output device.

Another type of filtering operates by averaging a sequence of overlapping windows, wherein there is one window for each pel of the image. To accomplish this function, new vertical and horizontal summing window array are disclosed. Assuming an M X N pel array, the outputs of the metering circuit are first transferred to a vertical splitter-summer array which divides each metered charge signal into M parts and adds the parts in appropriate sequence to parts of previously outputted metered charge signals. As the vertical sums of M parts are completed, they are transferred in parallel to a horizontal distribution and summing array where they are divided into N parts. Those parts are added in appropriate sequence with the parts of other horizontally adjacent parts of vertical sum charge signals to provide the area average charge signals to the stages of an area sum serial register. These area averages are then appropriately transferred to an output device.

BRIEF DESCRIPTION OF THE DRAWINGS

FIG. 3 is a flow chart representation of the operation of the device shown in FIG. 2.

FIG. 4 shows a topological layout which corresponds to the scheme described by FIG. 2a.

FIG. 7 is a layout diagram of an array of four-phase horizontal packet splitters and an area sum serial register.

FIG. 9 is an illustration which is useful for describing horizontal summing.

DETAILED DESCRIPTION

Figure 1:
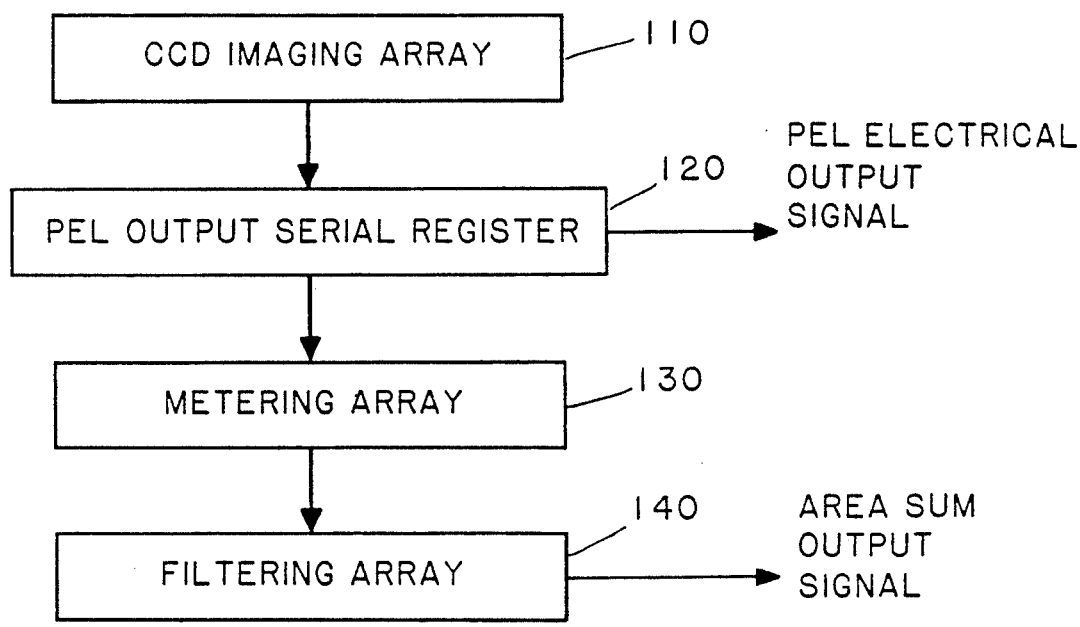
FIG. 1 is a block diagram of apparatus which generates an average signal of a pre-defined neighborhood area in a CCD imager.

In FIG. 1, a block diagram of the present invention is shown. Each pel of an image is represented in the CCD imaging array 110 by the amount of charge stored in a potential well. Charge packets representing a vector (or line) or pels emerge in parallel from the CCD imaging array into a pel output serial register 120 as the row is scanned. A metering circuit 130 divides each charge packet into two separate potential wells and maintains a fixed ratio between these fractional components. This technique is well known in the prior art. Part of each charge packet then resides in a stage of the pel output register 120 which is able to shift out the signal in a serial manner. Since the output is a fixed fraction of the original pel value, the integrity of the original pel value is maintained. The central pel intensity for each window average may subsequently be extracted from the output of the pel output serial register for various imaging processing functions. The remaining fraction of each charge packet is transferred to the filtering array 140 within which various window averaging computations may occur. The output of the filtering array is a serial stream of charge packets representing the magnitude of the desired area averages.

Figure 2A:
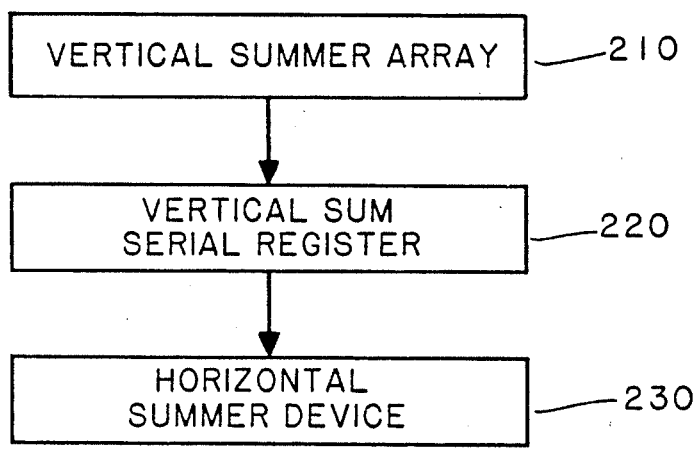
FIG. 2a is a block diagram of a filtering array which is capable of averaging non-overlapping windows, when used in conjunction with the apparatus shown in FIG. 1.

FIG. 2a shows a block diagram of a filtering array which is suitable for averaging pels over non-overlapping windows. The filtering array consists of a vertical summer array 210, a vertical sum serial register 220 and a horizontal summer 230. In a preferred embodiment of the invention, an M X N pel array is used as the window for averaging. For each pel, a charge $ST_{ij}$, representing a fixed fraction of the charge signal $S_{ij}$, is transferred by the metering circuit to the vertical summer array (VSA) 210 in accordance with the equation (1).

$$ST_{ij} = S_{ij}/(1+MN) \quad (1)$$

The remainder, $SO_{ij}$, of the charge signals $S_{ij}$ remains in corresponding stages of the pel output serial register in accordance with the equation (2).

$$SO_{ij} = MNS_{ij}/(1+MN) \quad (2)$$

The VSA 210 accumulates a total of M charge packets at each stage before transferring the resulting vertical sum charge packets in parallel to the vertical sum serial register 220. The average value of the M x N array is obtained by serially shifting the vertical sum charge packets through the horizontal summer device (230). The horizontal summer accumulates the values in each group of N vertical sum charge packets. This results in a serial stream of area average charge packets which are represented by the equation (3).

$$1/(1 + MN) \sum_{i=1}^{M} \sum_{j=1}^{N} S_{ij} = MN/(1 + MN) \bar{S} \quad (3)$$

In this equation, $\bar{S}$ is the average of the pel outputs corresponding to the individual pels within the M x N array.

For example, to obtain an average signal from a 3 by 3 array, $1/(1+9)$ or 1/10 of each pel value is directed to the vertical summer array while 9/10 of the pel value goes to the pel output serial register. After 9 summations (3 vertical by 3 horizontal), the area average output value is 9/10 of the average of the original value of the pels in the 3 by 3 array as they emerge from the imaging array. The corresponding pel outputs from the pel output serial register are also 9/10 of their original value.

Figure 4:
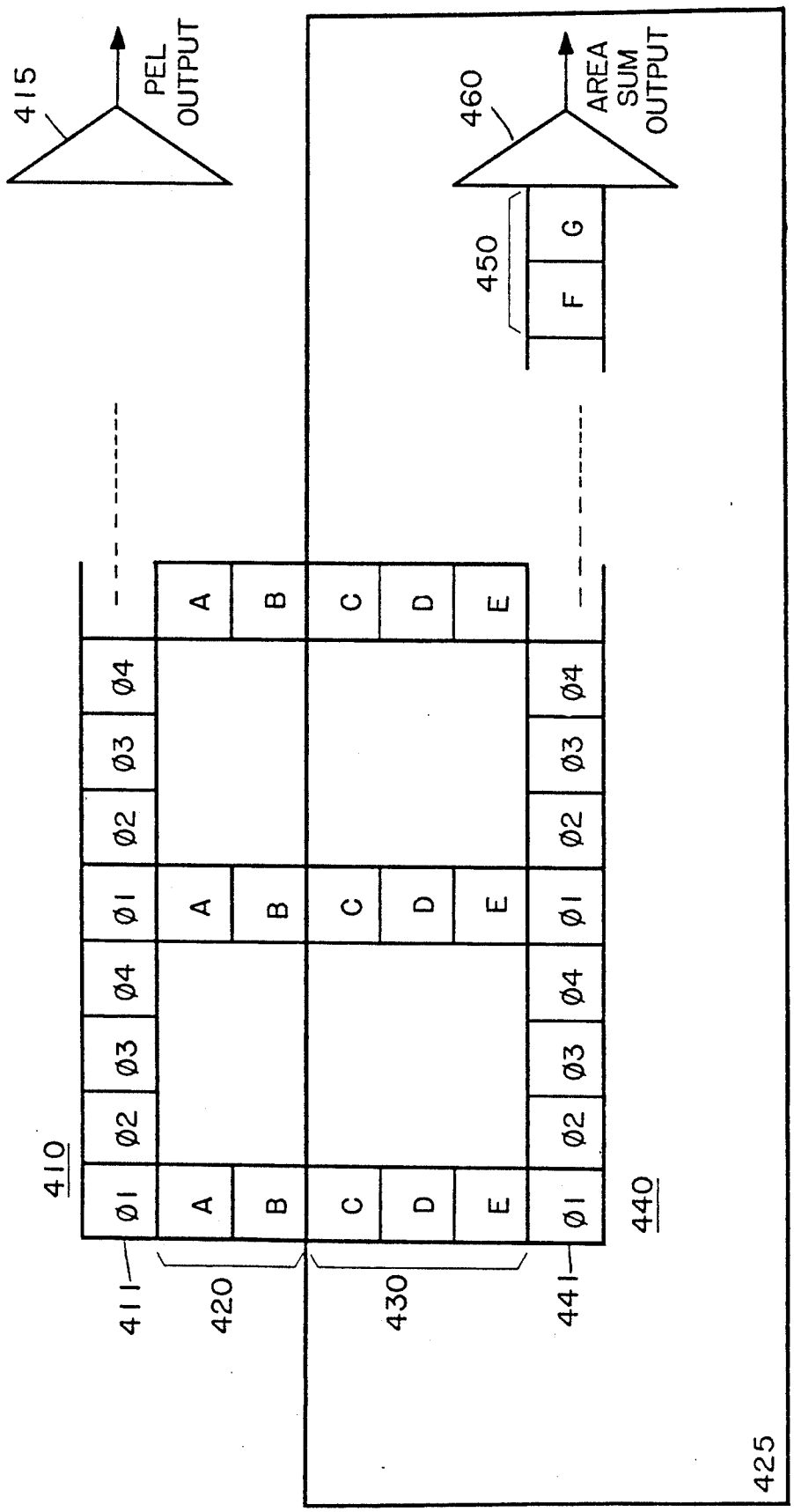
Figure 4A:
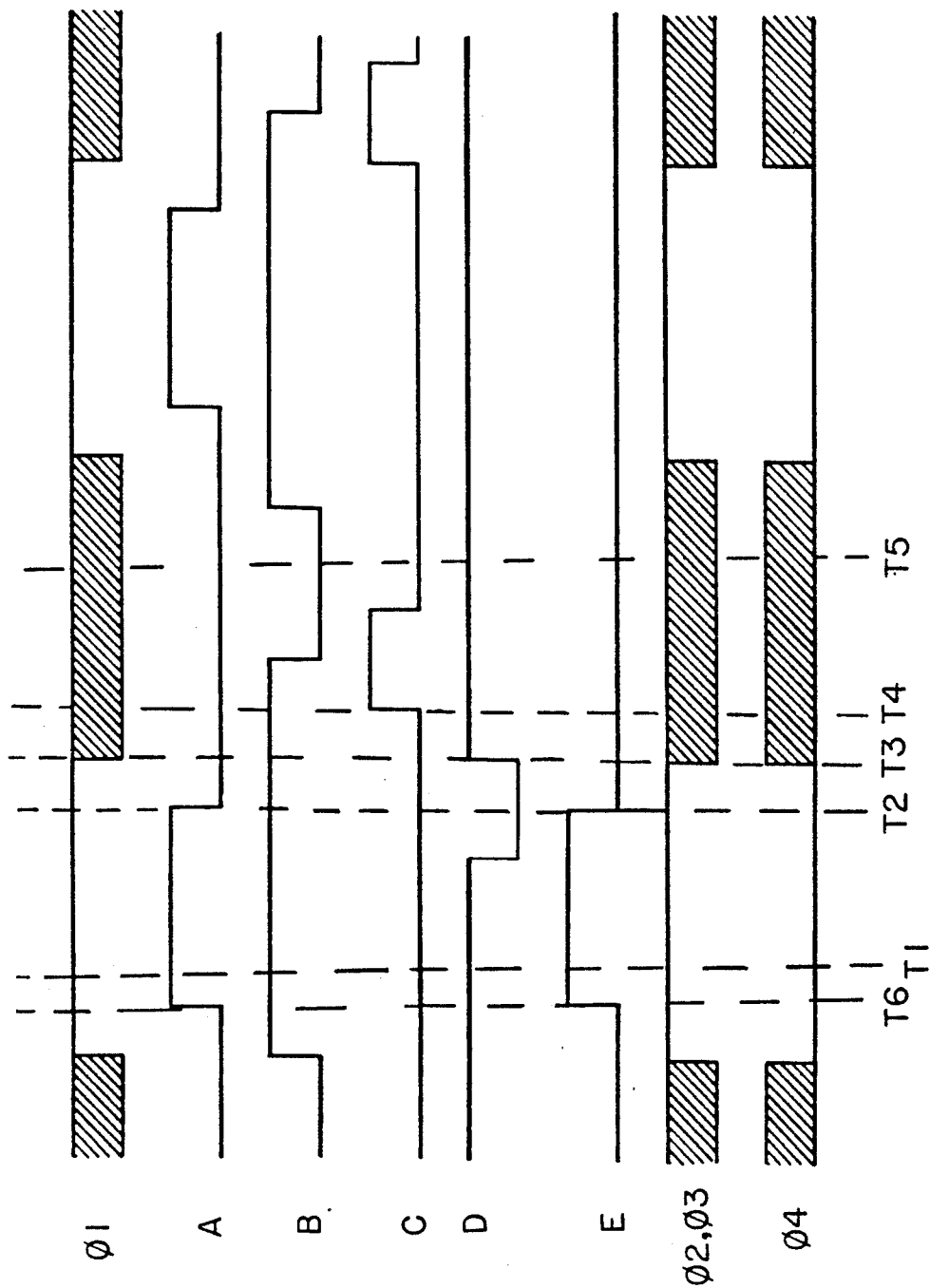
FIG. 4a is a timing diagram which corresponds to the device shown in FIG. 4.

In FIG. 4, a topological layout of a charge coupled array, which includes an embodiment of the present invention for non-overlapping windows, is shown. This layout uses by way of example, a standard 4-phase CCD structure with 2 polysilicon gate electrode layers. Regions shown represent areas of the semiconductor under the control of gate electrodes carrying the named clock phases. The operation will be explained with reference to the flowchart diagram shown in FIG. 3. The operation will also be explained with reference to the clock timing diagram of FIG. 4a, in which a high level represents the "on" state and a low level the "off" state. In the "on" state a potential well is induced, while in the "off" state a potential barrier is induced.

When pel output serial register clock phase 1 ($\Phi 1$) is on and clock phases 2 to 4 are off (time T1 in FIG. 4a), charge packets representing a horizontal row of pels enter all stages of the pel output serial register 410, in parallel, from the CCD imaging array (not shown) (Step 310). The pel output serial register 410 corresponds to the pel output serial register 120 of FIG. 1. The incoming charge packets reside, in this example, in potential wells under the phase 1 electrode 411 of each stage. To explain the operation of the invention, it is assumed that the present pel row is the first of M pel rows over which the average is to be taken.

A metering circuit 420, comprising gates controlled by phases A and B, is associated with each stage. The metering circuit 420 corresponds to the metering circuit 130 of FIG. 1. As the incoming charge packets enter the phase 1 potential wells, phases A and B are on while phase C is off. The new charge packets are shared by phase 1 and phases A and B (Step 320). At time T2, phase A is turned off, thus isolating a measured fraction of the charge in the potential well controlled by phase B. The complementary fraction of the charge is isolated at phase 1. This allows the pel output serial register to begin its shift operation at time T3, using phases 1 through 4. At the output terminal of the pel output serial register 410, pel output device 415 converts the charge packets to a pel electrical output signal.

The fractional charges from the metering circuit 420 are then transferred to the filtering array 425, corresponding to filtering array 140, as follows.

Vertical summer array 430 comprises gates controlled by phases C, D and E. At time T4 phase C is turned on. Phase D is turned on and phase E is turned off. Phases B and C are then turned off in turn to isolate the fractional charge packets in the vertical summing device controlled by Phase D at time T5. M charge packets from the M X N imaging array accumulate in each vertical summer over the course of M clock cycles to form the vertical sum charge packets (Step 330).

The end of one group of clock cycles corresponds in time to the beginning of another group of M clock cycles, as described above. Thus, at time T6, as phase A turns on to start the first cycle of the new group, phase E turns on to initiate the output of the vertical sum charge packets to the phase 1 potential wells 441 of the vertical sum serial register 440 (Step 340). At time T1 Phase 1 of the vertical sum serial register 440 and phase E of the vertical summer array 410 are on. Phase D and then phase E are turned off, at time T2, isolating the charge in the vertical sum serial register. The vertical sum serial register 440 begins its output scan at time T3 using phases 1 to 4. Phases 1 to 4 of the vertical sum serial register 440 may have the same waveform as the corresponding phases of the pel output serial register, thus the use of the same nomenclature.

In an alternate embodiment of the invention the function of the vertical summer array may be incorporated in the vertical sum serial register. However, in such an embodiment the two serial registers may not use the same clock waveforms, and the accumulation of the vertical sum and the shifting of the vertical sum serial register may not overlap in time.

Horizontal summer 450 is placed at the output terminal of vertical sum serial register 440 and comprises of phases F and G. As vertical sum charge packets emerge from the serial register 440, groups of N such packets accumulate in the phase F potential well 450 (Step 360). Phase F is on, while phase G is off, isolating the accumulating charge from the area average output device 460. Whenever N vertical sum charge packets accumulate in horizontal summer 450, the output device is reset, phase G is turned on, phase F is turned off and then phase G is turned off, transferring the contents of horizontal summer 450 to the output device 460 which converts the charge packets into an area average electrical output signal (Step 370). Phase F then turns on to begin accumulating the next N vertical sum charge packets. The output device is not reset until that accumulation is complete.

In an alternate embodiment of the present invention the output device 460 may also perform the function of the horizontal summer 450. However, this may result in the area average output being available for a shorter time than in the embodiment previously described.

While the M X N matrix arrays described above are arranged in row/column configuration, the array need not be limited to this configuration. For example, it is possible to arrange the pattern of the averaging windows in a configuration whereby the row/column axes are tilted at an angle. Such arrangements are very popular in the printing industry to enhance the perceived quality of an image.

Figure 2B:
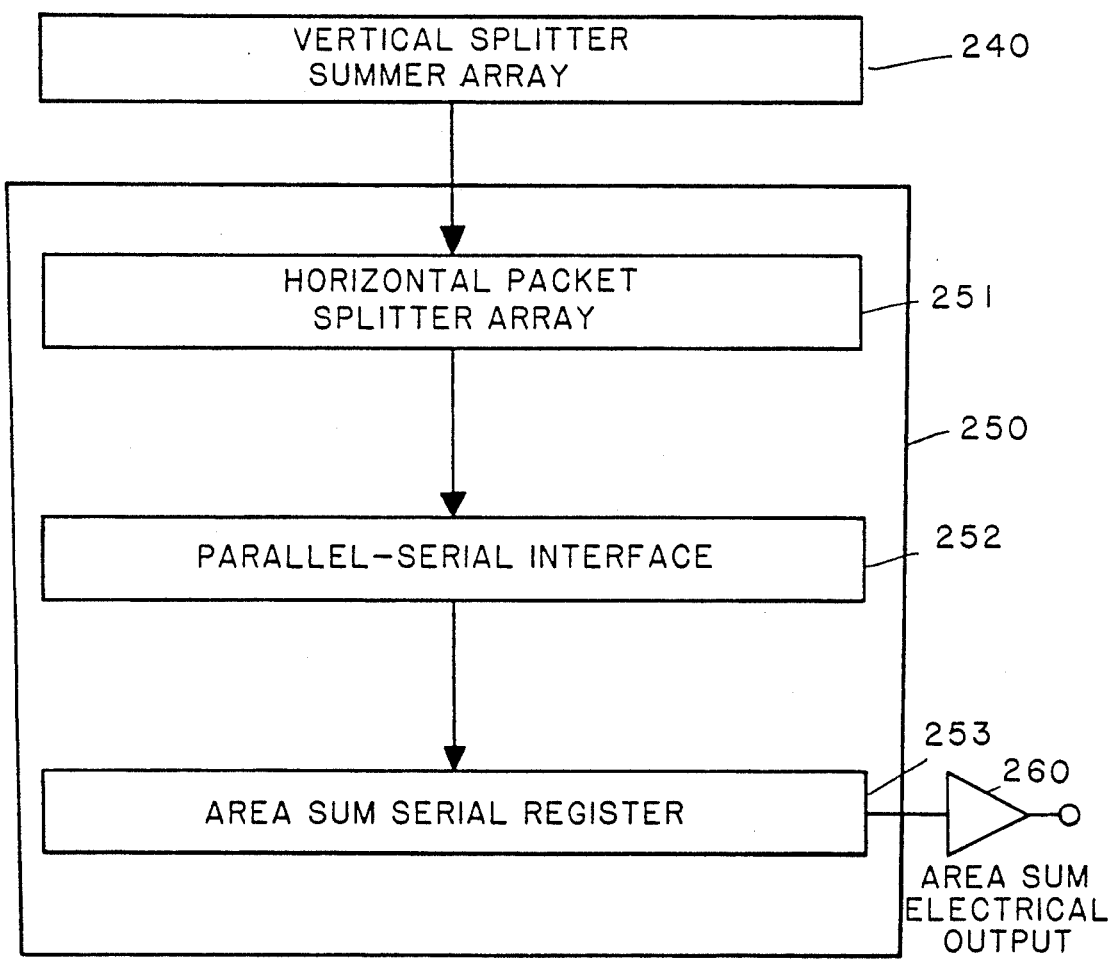
FIG. 2b is a block diagram of a filtering array which is capable of averaging overlapping windows, when used in conjunction with the apparatus shown in FIG. 1.

In FIG. 2b, a filtering array block diagram is shown for overlapping windows centered on each pel. This configuration differs from that of non-overlapping windows in that this configuration is associated with equal numbers of windows and pels. Furthermore, each pel is included in a plurality of windows. Thus, it is necessary to split the contributing charge packets into several parts, redistribute the parts, and add together appropriate combinations of parts to create the area average. In this case, the metering circuit 130 transfers half of each charge packet to the filtering array and retains half of each charge packet in the pel output register. The portions delivered to the filtering array are placed in a vertical splitter-summer array 240, after which the half in the pel output register may be serially shifted out. The vertical splitter summer array 240 further divides its portion into M equal parts to develop the overlapping vertical sum packets. These are transferred to horizontal distribution and summing array 250 consisting of horizontal packet splitter array 251, parallel-to-serial interface 252 and area sum serial register 253. The horizontal packet splitter array 251 divides the packets into N equal parts and distributes them through the parallel-to-serial interface 252 into the area sum serial register 253 where they are added in appropriate combinations to obtain the needed overlapping area sum packets, which are then transferred to the area sum output device 260.

Figure 5:
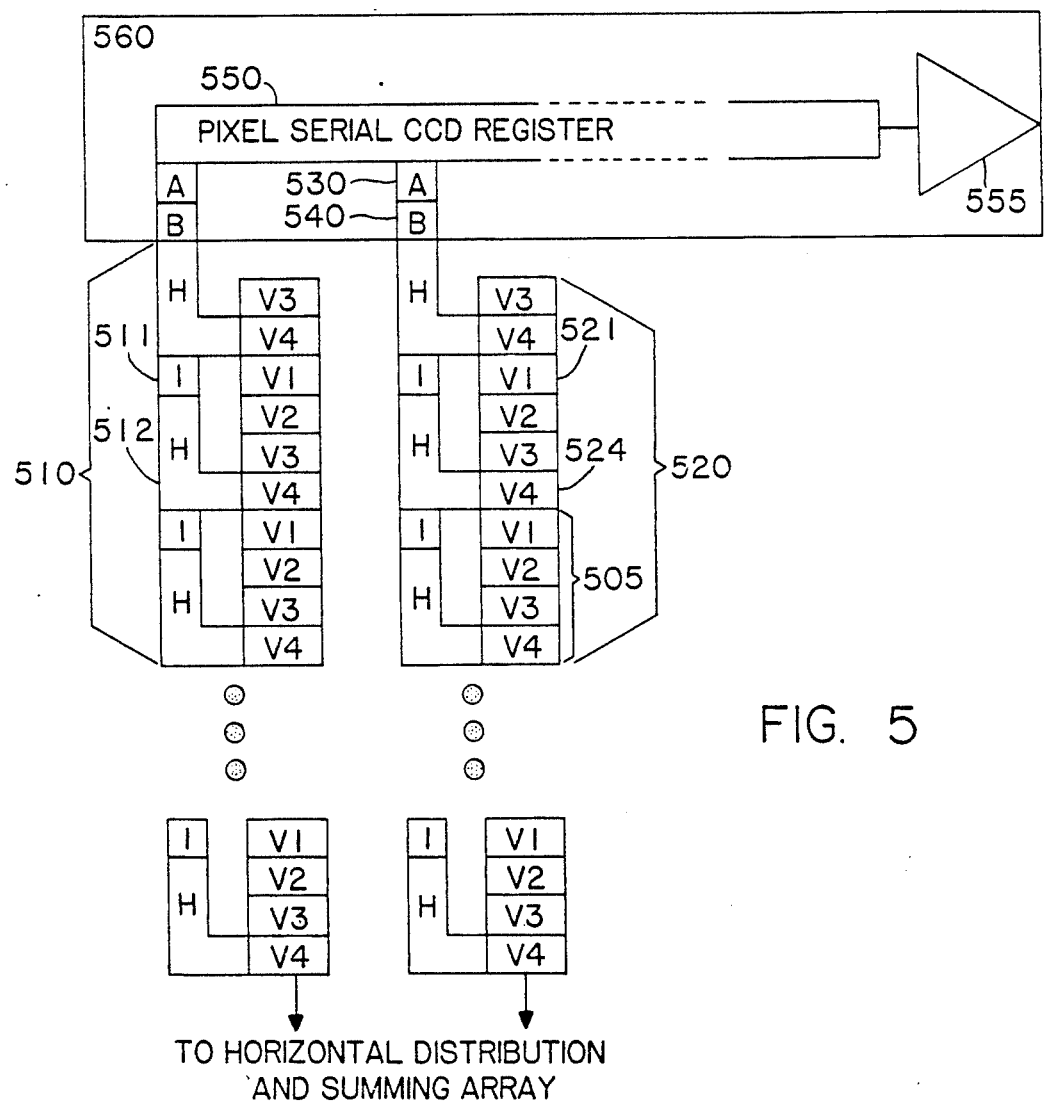
FIG. 5 is a layout diagram of an array of four-phase vertical splitter-summers.

The vertical splitter-summer array of FIG. 5 includes channel and channel-stop areas. Regions shown are sections of the channel that are influenced by gate electrodes carrying the indicated clock phase. Details of gate electrode layout are not shown in this figure, since they are subject to wide design variations. Furthermore, the design of the gate electrode layout is well know in the art. In a preferred embodiment of the disclosed invention, a standard 4-phase CCD structure with 2 polysilicon gate electrode layers is used.

Figure 6:
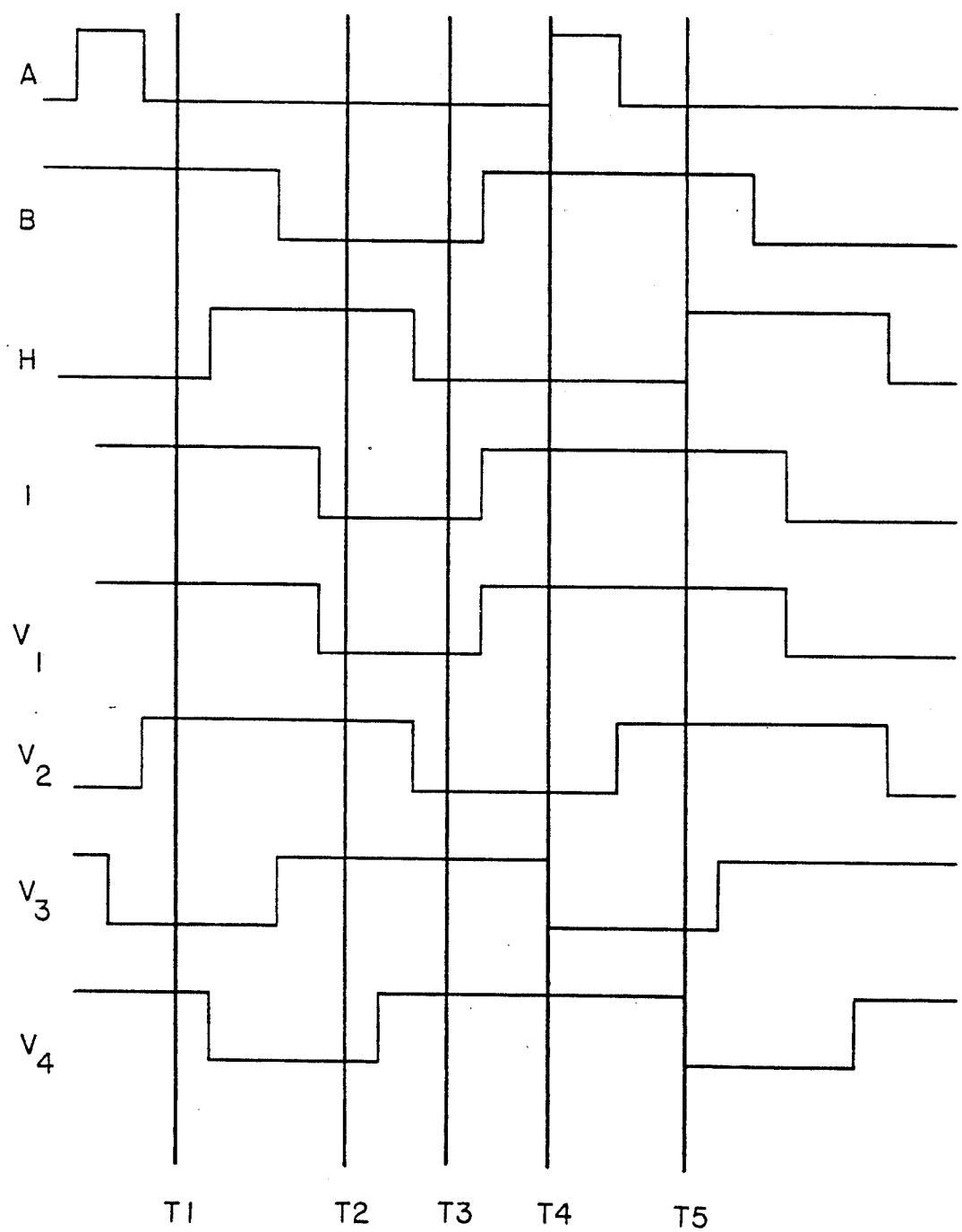
FIG. 6 is a timing diagram which corresponds to the device shown in FIG. 5.
Figure 8:
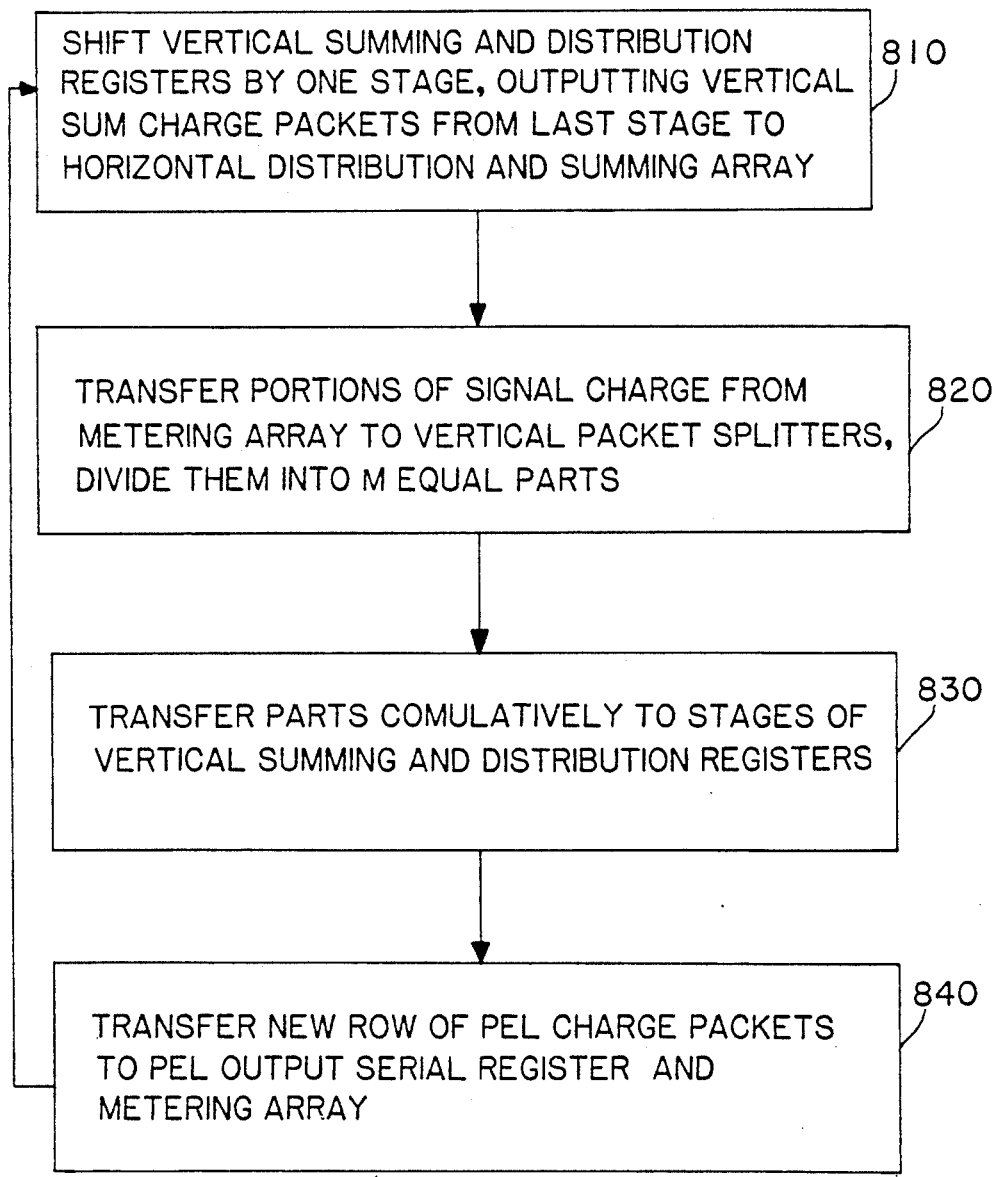
FIG. 8 is a flowchart diagram which illustrates the operation of the device shown in FIG. 7.

The apparatus of FIG. 5 will be explained with reference to the clock timing diagram of FIG. 6 and the flowchart diagram of FIG. 8. For explanatory purposes, it is assumed that the neighborhood being averaged is M x N pels, that the device has processed at least M previous pel rows. Thus, there are partial vertical sum charge packets which are stored in potential wells in each stage 505 of each M stage vertical summing and distribution register 520. The upper stage of each register contains a charge packet which is derived from the previous pel row. The contents of the following stage are derived from charge packets which are contributed by the previous two pel rows of the image. The contents of the next following stage are derived from charge packets which are contributed by the previous three pel rows, and so on.

The imaging array (not shown) and metering circuit 560 operate identically to that described in connection with FIG. 4, except that one half of each pel signal is extracted by the metering circuit. At time T1 in FIG. 6, the metering circuit portion resides at the potential well 540 controlled by phase B of the metering circuit, remaining there because phases A and H are off. After time T1 the pel output serial register 550 can begin shifting its contents to the pel output device 555.

Each vertical splitter-summer (as shown in FIG. 5) consists of a vertical packet splitter 510, potential wells 511 and 512 controlled by phases I and H, respectively, and a multiple stage vertical summing and distribution register 520, controlled by phases $V_1$ through $V_4$ (521–524). At time T1, Phases H and $V_3$ are off, while the other phases are on. After time T1, Phase $V_4$ turns off, completing the shifting of the contents of distribution register 520 downward by one stage, leaving the first or upper stage empty and transferring the contents of the last or lower stage 524 to the horizontal distribution and summing array (Step 810). Phase H then turns on, admitting the fractional charge from under Phase B into the gates controlled by Phases I and H. At time T2, Phase B turns off, then Phase I turns off, dividing the charge in each vertical packet splitter into M equal parts residing in potential wells under the gate electrodes of each vertical packet splitter that are controlled by Phase H (Step 820). The M parts are equal because the charge capacities under each Phase H gate 512 are equal.

At time T3, phase $V_4$ 524 of the vertical summing and distribution registers (VSDR) 520 turn on. Phase H 512 then turns off, moving the charge from under the Phase H gates 512 to the VSDR 520, where it adds to the partial vertical sum charge packets already present from prior vertical cycles. Subsequent to T3 and prior to T4 Phases B 540, I 511 and $V_1$ 521 turn on (Step 830).

In the first, or upper stage of each VSDR 520, only the present contribution is stored. In the next stage, contributions from the present and one previous pixel rows are added, and so on. In the last or lower stage, complete M-row vertical sums are stored.

At time T4, after the shifting of the pel output serial register 550 is complete, Phase A turns on and $V_3$ turns off and a new row of pel charge packets is transferred to the pel output serial register and metering circuit from the imaging array, thus beginning a new vertical cycle (Step 840). $V_2$ then turns on and at time T5, $V_4$ turns off, thus completing the downwardshift of the contents of VSDR 520 by one stage. The contents of the last stage of the VSDR 520, complete M-row vertical sums, have now transferred to the horizontal distribution and summing array (Step 810).

In describing the operation of the disclosed invention, it is noted that the phase numbers which have been used are strictly arbitrary. Other known CCD clocking schemes may be used in place of the indicated 4-phase double clocking. The vertical summing and distribution register phases shown are identical to the parallel clock phases which are used in a 4-phase double clocked system in which transfer from the imaging array to the pel output serial register occurs on the fall o parallel phase 3. Phase A and the parallel-to-serial interface clock of the pel output serial register may have the same timing. Phase I and Phase $V_1$ may have the same timing and share common electrodes.

In the horizontal distribution and summing array 250, in FIG. 2b, horizontal summing is performed in parallel for all of the pels in each row. This results in greatly improved scanning speed over the prior art.

As shown in FIG. 2b, the vertical sum packets are used as input signals to the horizontal distribution and summing array 250. The latter consists of three components: an array of horizontal packet splitters 251 which also serve as a horizontal distribution register, a parallel to serial interface 252 and an area sum serial CCD shift register 253. The area sum packets (serially outputted) are converted to electrical output signals by area sum output device 260.

For the example of an M x N neighborhood, each horizontal packet splitter 251 divides each vertical sum packet into N equal portions, each residing in a separate stage of each splitter, which also serve as vertically oriented N-stage CCD horizontal distribution shift registers. The lowermost portions are transferred in parallel into the area sum serial register 253. The horizontal distribution registers and the serial register are then clocked to shift their contents by one stage and the new lowermost portions are transferred in parallel into the serial register to add to the charge already there from the previous transfer. This is repeated until N portions of each vertical sum packet are distributed into N stages of the serial register and each of the serial register stages contains the horizontal sum of portions of N horizontally-adjacent vertical sums; thus an M - by - N area sum. The area sum serial register 253 then shifts the area sum packets horizontally to output device 260.

Horizontal sum generation is accomplished in N-1 serial register clock cycles, after which, the serial registers can be clocked rapidly to shift the data out as fast as the CCD is capable without being encumbered by further processing tasks.

FIG. 7 is a layout diagram of an exemplary horizontal packet splitter and area sum serial register. In this exemplary implementation, a 4-phase structure is used. However, it is possible to design a structure in which, for example, a 3-phase structure is used. The horizontal packet splitter is implemented with a surface channel and the area sum serial register is implemented with a buried channel. The boundary between the surface and buried channels is under the interface gate. Layout details of the gate electrodes are well known in the art and are omitted for clarity. The same four clock phases may be used by both the pel output and area sum serial registers. The parallel-to-serial interface gates of the two serial registers may be driven by a common clock.

Operation of the horizontal packet splitter 710 is initiated when the vertical sum packets are admitted into the device. This occurs when the four phases $H_1$ through $H_4$ 711-714 are all on, thus creating continuous potential wells throughout the N stages of each splitter, and the interface clock is off, thus isolating the splitters from the serial register (N is the number of horizontal pels in each row of the image array to be averaged). The charge then spreads uniformly in the splitter potential wells. When phase H4 switches to logic low, barrier potentials are created under the $H_4$ 714 gates, thus dividing the charge in each splitter into N equal portions, one in each stage. The charge may then be shifted downwards, stage by stage, in the normal 4-phase CCD fashion, through the parallel-to-serial interface gate 720 and into the area sum serial register 730 as described previously. The parallel to serial interface and the serial CCD register are based upon designs which are well know in the art.

The transfer into the area sum serial register is accomplished by turning on the interface gate while $H_4$ is off and $H_1$, $H_2$ and $H_3$ are on. The potential of the surface channel for the signal charge is higher than that of the buried channel. Thus, the charge from the last stage 715 of each splitter flows into the serial register.

A further explanation of horizontal sum generation is made with reference to the example shown in FIG. 9. At step 100, the amplitude of a plurality of vertical sum packets in a row are represented by upper case letters. At step 200, charge splitting and the transfer of one of the split packets into the serial register occurs. The serial register now contains one portion per stage, which is represented by lower case letters. In the example shown, a lower case letter represents one fifth the amplitude of its upper case counterpart. At step 300, the effect of one serial cycle and a second transfer is shown. Steps 400, 500 and 600 represent packet amplitude after a shift and a third transfer, a shift and fourth transfer, and a shift and a fifth transfer, respectively. It is at step 600 that the desired area sums are obtained. After step 600 the contents of the area sum serial register 730 is transferred to the output device (not shown). The area sum packets correspond to center pel packets which emerge from the apparatus at different times. Thus the value of the center pels are desirably digitized and stored, for example, in a digital computer (not shown) until the corresponding area sum packet emerges and its value determined.

In describing the disclosed invention it is noted that other CCD technologies may be used in place of the N-channel technology without the barrier implants that are shown in the figures and assumed in the explanations.

In describing the disclosed invention, it is understood that the embodiment is not limited to the vertical integrator as described being used with the horizontal integrator as described. The disclosed horizontal integration may occur with any form of vertical integration. Similarly the disclosed vertical integration may occur with any form of horizontal integration.

While the invention has been described in terms of an exemplary embodiment, it is contemplated that it may be practiced as outlined above with modifications within the spirit and scope of the appended claims.

The invention claimed is:

1. A method of generating an average signal for a matrix of picture element (pel) samples provided by an imaging device, said imaging device providing successive vectors of sampled data signals, where each vector represents a line in said matrix, the method comprising the steps of:
    a) dividing each sample in a vector of said plurality of samples into first and second fractional components to generate respective first and second sampled data vectors;
    b) providing said first sampled data vector serially at an output terminal;
    c) summing corresponding samples of successive ones of said second sampled data vectors to form an accumulated sampled data vector; and
    d) summing successive samples of said accumulated sampled data vector to generate said average signal.

2. The method set forth in claim 1 wherein:
    step a) includes the step of dividing each of said sample values into first and second fractional components having a ratio of M times N to 1, respectively, where M and N are positive integers;
    step c) includes the step of summing corresponding samples of M successive vectors of sample values to generate said accumulated sample vector; and
    step d) includes the step of summing N successive samples of said accumulated sample vector.

3. Apparatus for generating an average signal for a matrix of picture element (pel) samples, comprising:
    imaging means for providing successive vectors of sampled data signals, where each vector represents a line in said matrix;
    dividing means, coupled to said imaging means for dividing each sample in one of said vectors of samples into first and second fractional components to generate respective first and second sampled data vectors corresponding to said one vector;
    means for providing said first sampled data vector serially at an output terminal;
    first accumulating means for summing corresponding samples of successive ones of a plurality of said second sampled data vectors to form an accumulated sampled data vector;
    second accumulating means for summing successive samples of said accumulated sampled data vector to generate said average signal; and transferring means for providing results of said first accumulating means to said second accumulating means.

4. The apparatus set forth in claim 3 wherein:
said dividing means includes means for dividing each of said sample values into first and second fractional components having a ratio of M times N to 1, respectively, where M and N are positive integers;
said first accumulating means includes means for summing corresponding samples of M successive vectors of sample values to generate said accumulated sample vector; and
said second accumulating means includes means for summing N successive samples of said accumulated sample vector.

5. The apparatus set forth in claim 3 wherein;
the imaging means includes a matrix of charge coupled devices;
each vector of sampled data signals includes a plurality of electrical charge packets;
the first accumulating means includes a charge coupled array having potential wells;
the transferring means includes a serial vector of charge-coupled devices;
the second accumulating means includes a charge coupled device having a potential well;
said means for providing said first sampled data vector serially at an output terminal includes a serial charge coupled device;
the dividing means includes a charge coupled array having a plurality of potential wells; and
each of said plurality of potential wells are divided by electrically induced potential barriers into two potential wells with charge capacities in a predetermined ratio.

6. A method of generating an average signal for a matrix of pel samples provided by an imaging device, said imaging device providing successive vectors of sampled data signals, where each vector represents a line of said matrix image and each sample represents a picture element (pel), the method comprising the steps of:
a) dividing each sample in a vector of said plurality of samples into first and second fractional components to generate respective first and second sampled data vectors;
b) providing the samples of said first sampled data vector serially at an output terminal;
c) further dividing each element of said second sampled data vector into a plurality of equal components;
d) adding together respective corresponding equal components from each second sampled data vector to form a plurality of accumulated sampled data vectors;
e) subdividing each of said accumulated sampled data vectors into a plurality of successive second subvectors, wherein each second subvector consists of a plurality of equal elements;
f) adding together the respective elements of said plurality of second subvectors.

7. The method set forth in claim 6 wherein said first and second fractional components are equal.

8. Apparatus for generating an average signal for a matrix of picture element (pel) samples over overlapping regions of an image, comprising:
imaging means for providing successive vectors of sampled data signals, where each vector represents a line in said matrix of picture element samples and each sample represents a pel;
first dividing means, coupled to said imaging means for dividing each sample in one of said vectors of samples into respective first and second fractional components to generate first and second sampled data vectors corresponding to said one of said vectors of samples;
means for providing said first sampled data vector serially at an output terminal;
second dividing means for dividing each element of said second sampled data vector into a first subvector with a plurality of elements having substantially equal values;
subvector summing and vertical shifting means for adding the elements of each first subvector to respective elements of successive subvectors to form respective elements of an accumulated sampled data vector;
third dividing means for dividing each of said accumulated sampled data vector elements into a second subvector wherein said second subvector consists of a plurality of substantially equal elements;
means for generating an area sum vector by repeatedly accumulating elements of said second subvectors with corresponding elements of said area sum vector and shifting the elements of said area sum vector with respect to the elements of said second subvector to change the correspondence therebetween.

9. The apparatus set forth in claim 8 wherein said first dividing means includes means for generating first and second fractional components of equal value.

10. The apparatus set forth in claim 8 wherein:
said imaging means includes a charge coupled device;
the vectors of sampled data signals include respective pluralities of electrical charge packets;
said first dividing means includes a charge-coupled array having potential wells which are divided by electrically induced potential barriers into a plurality of potential wells with charge capacities in a predetermined ratio;
said means for providing the first sampled data vector serially at the output terminal includes a first serial charge-coupled device;
said second dividing means includes multiple potential wells each of which can be divided into a respective plurality of potential wells of substantially equal charge capacity by means of electrically induced potential barriers;
said subvector summing and vertical shifting means includes an array of vertically disposed charge-coupled devices, for receiving charge in parallel from said second dividing means;
said third dividing means includes a second array of vertically disposed charge-coupled devices; and
said means for summing and shifting said second subvector elements includes:
a second serial charge-coupled device disposed to receive charge in parallel; and
parallel to serial interface means for transferring said charges from said third dividing means to said second serial charge coupled device.

11. Apparatus for performing horizontal integration on charge packets produced by a charged coupled device (CCD), comprising:
packet splitter means for dividing each of said charge packets into a plurality of separate portions and including a plurality of charge packet shifting means for shifting said charge packets, wherein each charge packet shifting means includes a plurality of stages and a terminal stage;

means for transferring each of said separate portions to respectively different ones of said plurality of stages;

means for shifting said separate portions through said shifting means to said terminal stages;

further charge packet shifting means having a plurality of stages;

means for transferring said separate portions from each terminal stage of said plurality of charge packet shifting means to respectively different stages of said further charge packet shifting means wherein an accumulation of said separate portions of charge packets occurs in each stage of said further charge packet shifting means, and each accumulation includes a plurality of said separate portions from a plurality of successive ones of said terminal stages;

means for shifting the accumulated charge packets in the respective stages of said further charge packet shifting means to an output terminal.

12. The apparatus set forth in claim 11 including means for applying a clock signal wherein said plurality of charge packet shifting means and said further charge packet shifting means each includes a plurality of stages and means for transferring charge packets between successive ones of said stages responsive to said clock signal.

13. The apparatus set forth in claim 12 wherein:
said packet splitter means includes means, responsive to said clock signal, for transferring charge packets to said plurality of charge packet shifting means.

14. The apparatus set forth in claim 13, wherein said plurality of charge packet shifting means includes means, responsive to said clock signal, for transferring charge packets to said further charge packet shifting means.

15. The apparatus set forth in claim 14 wherein; said means for transferring each of said separate portions to said further charge packet shifting means includes means for simultaneously transferring a plurality of separate portions to a respective plurality of stages of said further charge packet shifting means.

16. A method of performing horizontal integration for charge packets produced by a charge coupled device (CCD), said method comprising the steps of:
a) splitting a charge packet into a plurality of separate components;
b) transferring each of said separate components to one of a plurality of charge packet shifting devices, respectively;
c) transferring each of said separate components from initial stages of said charge packet shifting devices to final stages of said charge packet shifting devices;
d) transferring each of said separate components from the final stages of said charge packet shifting devices to respectively different stages of a further charge packet shifting device wherein accumulation of charge packets occurs; and
e) shifting said further charge packet shifting devices by one stage.

17. The method of claim 16, wherein steps a) through e) are performed a plurality of times for a plurality of charge packets provided by the charge coupled device.

18. The method of claim 16 wherein said further charge packet shifting device shifts charge packets held by successive stages toward an output terminal.

19. Apparatus for performing vertical integration of charge packets produced by a charge coupled device (CCD), comprising:
packet splitter means for dividing each of said charge packets into a plurality of separate portions;
charge packet shifting means, coupled to said packet splitter means, for receiving and accumulating the respective plurality of separate portions to produce a plurality of charge packets;
and means for transferring the resulting plurality of charge packets to an output terminal.

20. The apparatus set forth in claim 19 including means for applying a clock signal wherein said charge packet shifting means includes a plurality of stages and means for transferring charge packets between successive ones of said stages responsive to said clock signals.

21. The apparatus set forth in claim 20 wherein said packet splitter means includes means, responsive to said clock signal, for transferring charge packets to said packet shifting means.

22. The apparatus set forth in claim 21, further including means, responsive to said clock signal for transferring charge packets from said packet shifting means to a means of horizontal integration.

23. The apparatus set forth in claim 22 wherein; said charge packet shifting means includes means for distributing a plurality of separate portions throughout all stages of said charge packet shifting means.

24. A method of performing vertical integration for charge packets produced by a charge coupled device (CCD), said method comprising the steps of:
a) splitting a charge packet into a plurality of separate components; and
b) transferring each of said separate components to one of a plurality of charge packet shifting devices, respectively, wherein accumulation of said separate components occurs.

25. The method of claim 24 comprising the additional steps of:
c) transferring each of said separate components from initial stages of said charge packet shifting devices to final stages of said charge packet shifting devices; and
d) transferring each of said separate components from the final stages of said charge packet shifting devices to a horizontal integration device wherein an average signal for charge packets produced by the CCD may be determined.

26. The method of claim 25 wherein steps c) and d) are performed concurrently.

27. The method of claim 26 wherein steps a) through d) are performed a plurality of times for a plurality of charge packets within a charge coupled device.

* * * * *